United States Patent [19]
VanSelous et al.

[11] Patent Number: 5,429,560
[45] Date of Patent: Jul. 4, 1995

[54] VALVE AND HYDRAULIC SYSTEM FOR OPERATING A FRICTION ELEMENT OF AN AUTOMATIC TRANSMISSION

[75] Inventors: Joseph S. VanSelous, Highland; Kenneth G. Weidman, Brighton, both of Mich.

[73] Assignee: Ford Motor Company, Dearborn, Mich.

[21] Appl. No.: 82,634

[22] Filed: Jun. 28, 1993

[51] Int. Cl.$^6$ ............... F16H 61/00; F16H 61/08
[52] U.S. Cl. ................... 477/127; 475/128
[58] Field of Search ............ 475/116, 121, 128; 477/127; 137/625.66, 625.69

[56] References Cited

U.S. PATENT DOCUMENTS

| | | | |
|---|---|---|---|
| 3,014,383 | 12/1961 | Flinn | 475/128 |
| 4,090,417 | 5/1978 | Burcz et al. | 477/62 |
| 4,145,937 | 3/1979 | Shindo et al. | 477/127 |
| 4,462,279 | 7/1984 | Sumiya | 477/141 |

OTHER PUBLICATIONS

Hydra-Matic 4L80-E Technician's Guide, Nov. 1990, General Motors Corporation.

*Primary Examiner*—Charles A. Marmor
*Assistant Examiner*—Troy Grabow
*Attorney, Agent, or Firm*—Frank G. McKenzie; Roger L. May

[57] ABSTRACT

A valve (36) for controlling pressure supplied to a friction clutch (32) of an automatic transmission includes several valve spools (38,40,44) each formed with control lands located within a bore (42) opening to various ports (60,66,68,72,76,80) that are supplied selectively with line pressure depending upon the operating state of the transmission. The valve operates in a primed condition, whereby a predetermined low pressure is supplied continually to the friction clutch. The valve supplies the clutch with a higher pressure that operates to stroke the clutch cylinder and friction element and thereafter regulates clutch pressure in accordance with changes in pressure in one of the ports. The clutch is stroked rapidly because the valve provides a relatively unrestricted supply of pressurized fluid through one of its inlet ports. After the clutch free-pack clearances are taken up, the valve restricts the clutch stroke against a cushion spring by opening the clutch cylinder to an orificed supply circuit. A delayed response to a change in operating state of the valve is minimized such that the control lands of the valve spools do not fully open line pressure supplied to the valve.

6 Claims, 3 Drawing Sheets

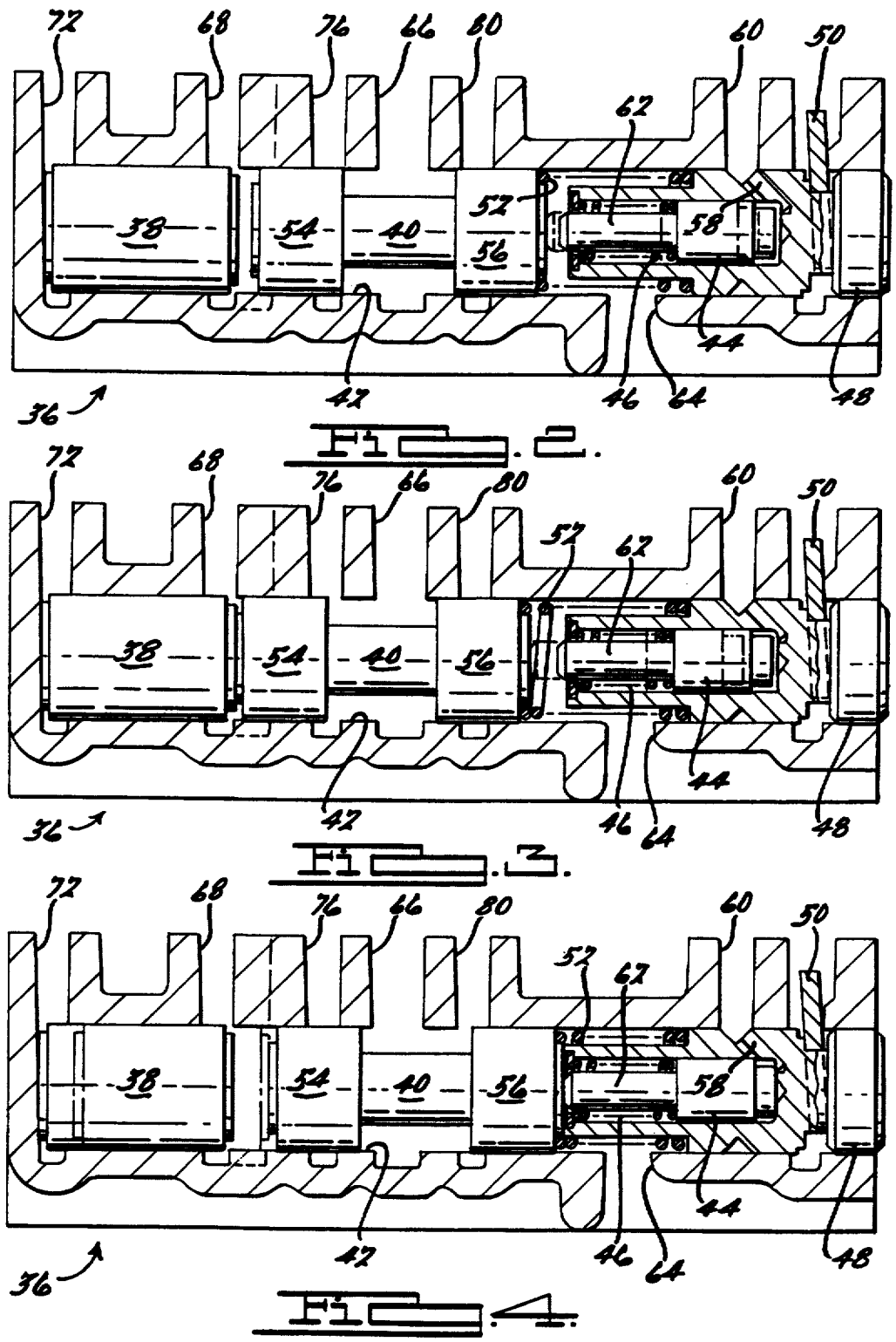

VALVE AND HYDRAULIC SYSTEM FOR OPERATING A FRICTION ELEMENT OF AN AUTOMATIC TRANSMISSION

BACKGROUND OF THE INVENTION

1. Field of the Invention

This invention pertains to the field of automatic transmission hydraulic controls and actuation systems. More particularly, the invention pertains to such a system that maintains pressure in the friction element, modulates the application of the element and applies the friction element at full torque capacity.

2. Description of the Prior Art

In an automatic transmission the hydraulic circuit that controls and actuates friction elements, such as clutches and brakes, contains a source of regulated line pressure which is opened and closed through various control valves to clutches and brakes that are engaged and released selectively to produce the various forward speed ratios and reverse drive. Generally when gear ratio changes are made, a shift valve, dedicated to controlling a gear ratio change, changes state due to the presence or absence of solenoid pressure applied to the shift valve in accordance with an electronic signal produced by a microprocessor in response to a gear ratio command produced by software stored in electronic logic accessible to the microprocessor. When the friction element is to be disengaged, the appropriate shift valve closes communication between the source of regulated line pressure and the friction element, generally by removing solenoid pressure from the shift valve. However, when the friction element is disengaged, that portion of the hydraulic circuit between the friction element and shift valve is susceptible to being filled with air. This condition delays reapplication of the friction element and can result in a harsh gear ratio change, perceptible to the vehicle operator.

To avoid abrupt gear ratio change, various means have been devised to prevent accumulation of compressible fluid in the hydraulic circuit leading to the various friction elements. For example, various orifices are located in the hydraulic circuit between the various friction elements in the high pressure line pressure source during the period when fluid is vented from the friction element and absent in the hydraulic circuit leading to the friction element. Orifices for this purpose allow pressurized fluid to bleed into the portion the hydraulic circuit leading to the friction element when the transmission is disposed for operating in the park range, reverse, neutral and certain forward drive ratios, other than the ratio during which the relevant friction element is engaged and supplied with pressurized fluid. Permitting fluid at line pressure to enter the hydraulic circuit through the orifices prevents to a certain degree harsh shift engagement when the friction element is connected directly to the fluid pressure source through the shift valve. However, the orifices must be sized such that they do not allow enough pressure to build up in the circuit to move the clutch piston of the friction element during those periods when the friction element is not engaged.

SUMMARY OF THE INVENTION

A valve according to the present invention, through which hydraulic pressure is transmitted to a friction element of an automatic transmission to engage the friction element, includes means for continually applying hydraulic pressure at relatively low pressure during the period while the friction element is disengaged. The low pressure primes the clutch circuit for subsequent engagement quickly without harsh engagement. An additional advantage is the capacity to modulate pressure applied to the clutch during the engagement period in accordance with a variable control pressure applied to the clutch. The valve strokes the hydraulic piston, engages the friction elements of the clutch when pressure is supplied to the friction element above the low pressure priming magnitude and below the minimum magnitude, at which pressure is modulated during the application of the friction element.

The full torque capacity of the friction element is applied after stroking and modulation of pressure during the application phase when the valve fully opens a first supply port to a port that carries hydraulic fluid to the friction element. The friction element is vented through a modulator valve according to the present invention by applying a control pressure to the valve that operates to close a supply port and to direct hydraulic fluid from the friction element to a vent port.

In realizing these objectives and advantages the modulator valve according to the present invention includes a valve bore, several hydraulic supply ports through which a line pressure source and various control pressure sources are selectively opened and closed to the valve bore. An outlet port or feed port connecting the valve to a friction element opens to the bore and includes a feedback passage containing an orifice that returns clutch pressure to the valve bore. Located within the bore are multiple spools moveable along the length of the bore due to the effects of various hydraulic pressures and several control springs.

The friction element is maintained in a primed condition by regulating line pressure to a relatively low magnitude by balancing the effect of a compression spring against a pressure force developed on a surface of one of the valve spools by clutch feedback pressure. The valve opens the source of line pressure to the friction element to stroke the valve rapidly and to modulate pressure linearly with the magnitude of the control pressure applied to the valve. To accomplish this result, a center spool has applied to it a pressure force developed by the control pressure of a second spool that operates against the effect of a second control spring to move the center spool in opposition to the feedback pressure force, thereby modulating the pressure applied to the friction element linearly with changes in the control pressure.

When full torque capacity of the friction element is to be applied, the first supply port closes and a second supply port opens as the first and second valve spools are balanced by feedback pressure against control pressure. This allows rapid application of the clutch to full torque capacity after modulating the pressure and taking up clearances during the stroking operation.

When the friction element is to be disengaged, a third spool within the bore is pressurized by a second control pressure that forces the first spool to close the supply ports and to vent the passage connecting the valve to the clutch cylinder.

BRIEF DESCRIPTION OF THE DRAWINGS

FIGS. 2, 3 and 4 are cross sections through a valve body showing a valve for a friction element of an automatic transmission. The figures show the valve in position to regulate pressure to the friction element to stroke the friction element and to apply full capacity, respectively.

DESCRIPTION OF THE PREFERRED EMBODIMENT

Figure 1A:
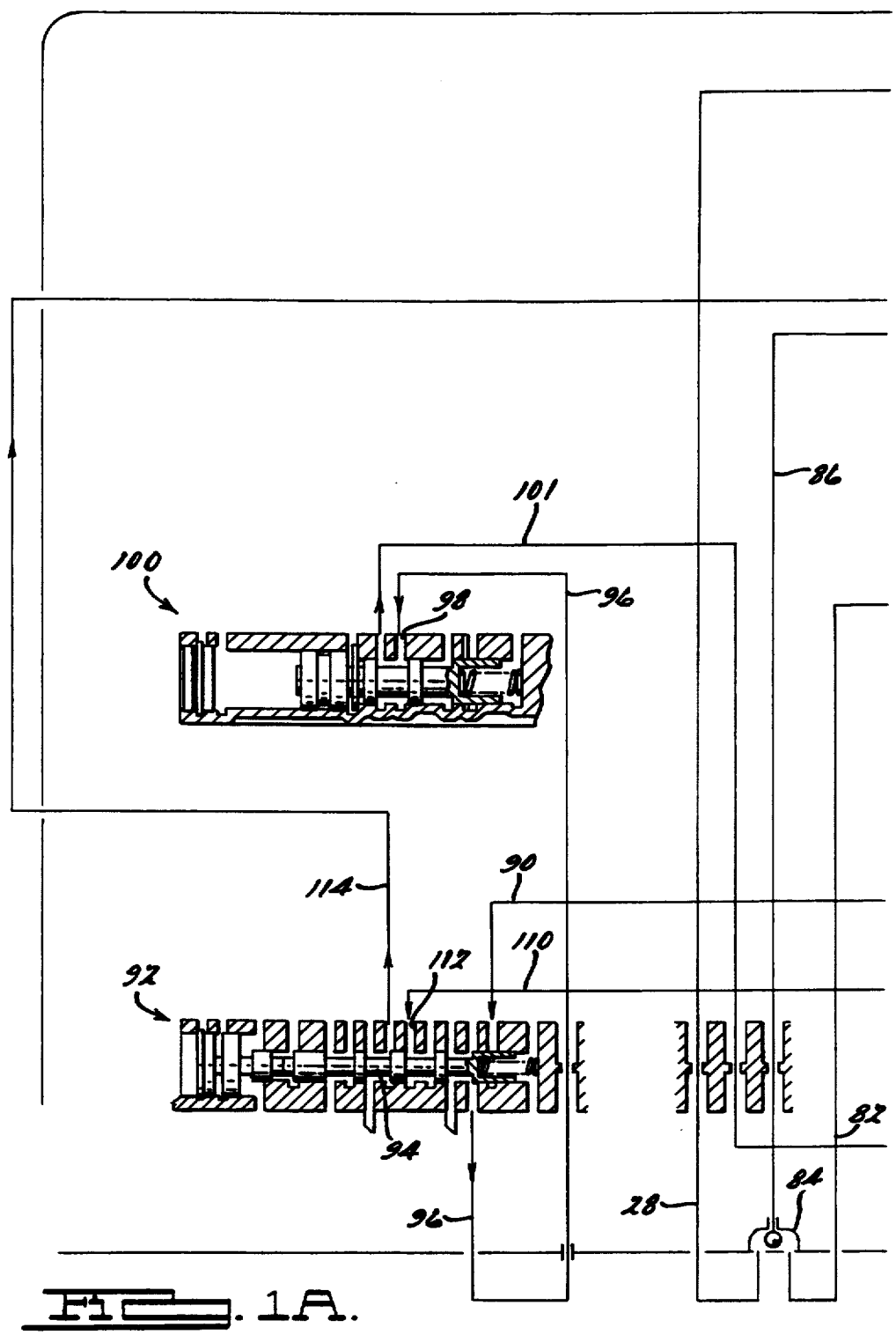
FIGS. 1A–1B taken together show a portion of a hydraulic actuation and control system for an automatic transmission according to the invention.
Figure 1B:
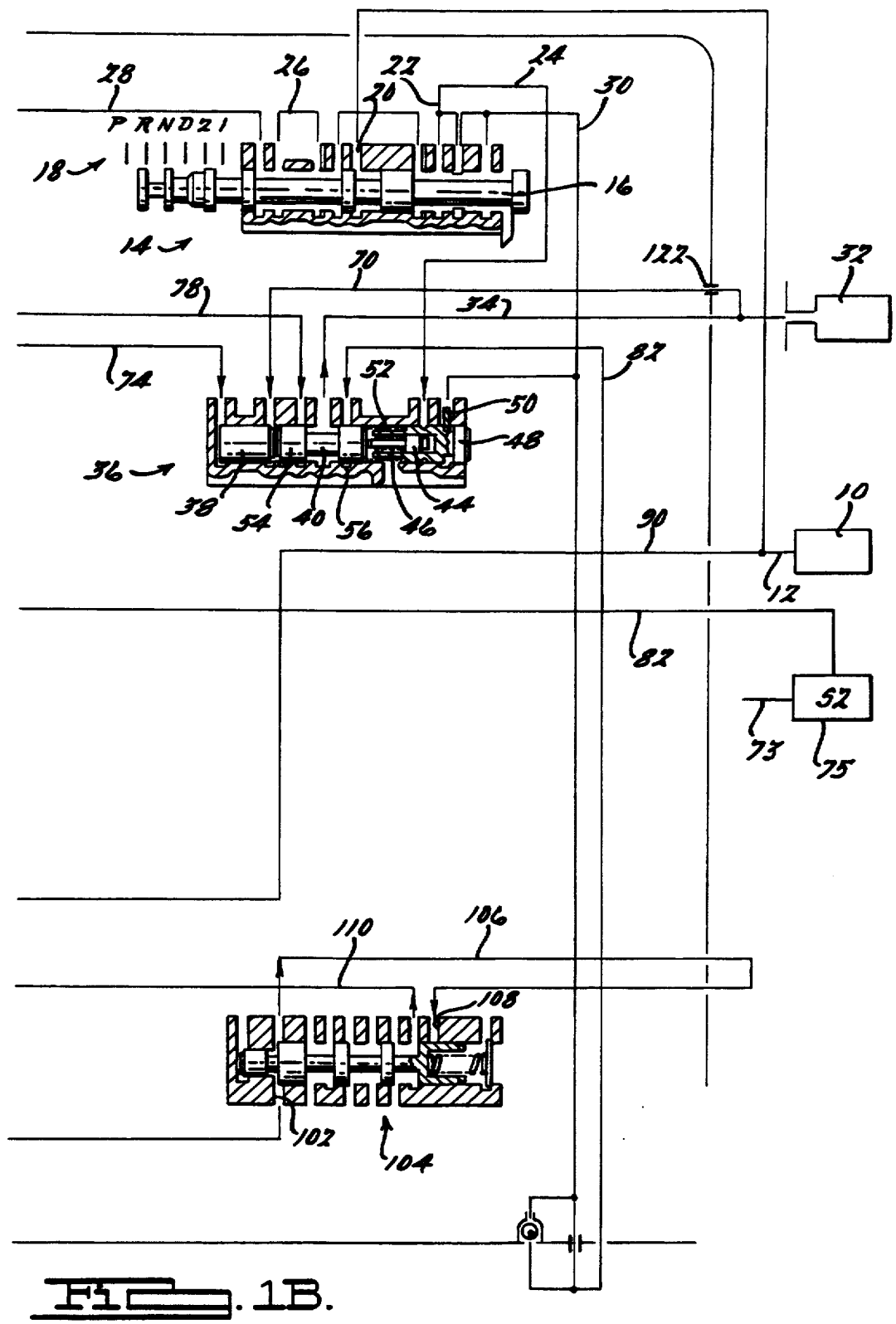

Referring first to FIGS. 1A and 1B a source of pressurized hydraulic fluid, a fixed displacement pump 10, such as a gerotor pump, is supplied with fluid at its inlet side, where a low pressure sump is connected, and supplies fluid to a hydraulic circuit through a hydraulic line 12 connected to a manual valve 14. The manual valve includes spool 16, which moves within the valve bore among various locations corresponding to the positions 18 of a gear selector lever, moved manually by the vehicle operator. Fluid in line 12 is maintained within a predetermined range by a line modulator valve 20 located between the pump outlet and the manual valve. The spool 16 of the manual valve is formed with several control lands that selectively open and close connections between line pressure inlet port 20 and ports that connect various hydraulic lines to the ports of the hydraulic circuit. For example, when the manual valve is moved to the reverse (R), or manual 1 (M1) position, lines 22 and 24 are connected to line pressure source. When the manual valve is moved to the OD, M2 and M1 positions, passage 26 is connected through the manual valve to the line pressure source. When manual valve 16 is moved to the manual 2 (M2) position, passage 28 is connected to the line pressure source. Passage 30 is pressurized by the line pressure source when the manual valve is moved to the reverse (R) position.

A low reverse clutch 32, a hydraulically-actuated friction clutch that is engaged to produce the first forward speed ratio and reverse drive ratio and is released during operation of the transmission in the other forward speed ratios, is pressurized with hydraulic fluid through passage 34, which is connected to a low/reverse modulator valve 36. Clutch 32 is released by venting passage 34 through an exhaust port of the system.

Valve 36 includes first and second large spools 38,40, which move in a valve bore 42 due to the effect of spring forces and pressure forces developed on the surfaces of the spools. At the right-hand end of the bore, a third spool 44 is biased by a compression spring 46 to a seated position against the surface of a plug 48 fixed against displacement by a spring clip 50 on the valve body.

A compression spring 52 urges spool 40 leftward away from plug 48 and into contact with spool 38. Spool 40 is formed with control lands 54,56, which open and close various ports that connect bore 42 with other portions of the control circuit.

Referring now to FIGS. 2–4, plug 48 is formed with a radially directed passage 58, which connects port 60 and the right-hand end surface of spool 44. Pressure developed on the surface of spool 44 operates against the spring 46 to force a stem 62 of spool 44 into contact with the end of control land 56. An exhaust passage 64 connects the portion of bore 42 located between control land 56 and plug 48 to a low pressure vent or sump.

Port 66 connects passage 34 to the low-reverse clutch 32, and port 68 is a feedback port connected to passage 34 through feedback passage 70. A first port 72 is supplied with line pressure when manual valve 14 is moved to the M2 range, a range of operation selected manually by the vehicle operator wherein the highest forward speed ratio is the second speed ratio. Port 72 is supplied also with regulated solenoid pressure when electrically operated solenoid valve 75 is energized, thereby opening a connection between a source of supply of regulated solenoid pressure carried to port 72 through passage 74 as will be described below.

Port 76 is pressurized with line pressure through passage 78 when the shift valves 92 and 104 are both in their downshifted positions (park, reverse, neutral, OD and M1 range positions). Reverse port 80 is connected to the source of line pressure through manual valve 14 and passages 30 and 82.

Regulated solenoid pressure supplied through passage 73 to solenoid 75 is opened to the outlet passage 82 when the solenoid of the pressure-actuated solenoid valve 74 is energized by an electrical control signal received from a microprocessor in response to a command to change the current operating gear ratio of the transmission. Passage 82 is connected to a two port check valve 84. A second inlet of check valve 84 is connected by passage 28 to a port of manual valve 14, which is connected to the line pressure source when the manual valve is moved to the M2 range. Both M2 and $2 pressure are connected by passages 86, 74 to port 72 of the low/reverse modulator valve 36. Accordingly, port 72 is supplied with line pressure when the manual valve is moved to the M2 range and when the solenoid 75 is energized.

Regulated line pressure is carried in passage 90 from the exit side of pump 10 to a port of 1-2 and D2 shift valve 92 having a spool 94 carrying multiple control lands, which open and close connections between the various ports of the valve. To produce the first forward speed ratio, spool 94 of valve 92 moves rightward, thereby opening a connection between passage 90 and passage 96, which is connected to port 98 of 4-3-2 manual timing valve 100. When the timing valve is in the state shown in FIG. 1A, a direct connection is made by the valve between passages 96 and 101, which is connected to a port 102 of 2-3 shift valve 104. The spool of valve 104 moves rightward within its bore in order to produce the second forward speed ratio of the transmission. In the second speed ratio position, valve 104 completes a connection between passages 108 and 110, which is connected to port 112 of valve 92. Spool 94 of valve 92 is located at the right-hand end of the valve bore for the first forward speed ratio, thereby opening a connection between passages 110 and 114, which carries PRN1 pressure through passage 78 to port 76 of the low/reverse modulator valve 36.

The low/reverse modulator valve 36 operates to provide a predetermined low priming pressure to clutch 32, a variable modulated pressure, clutch pressure corresponding to maximum torque capacity, clutch venting and improved response of valve 36 when performing manual 2-1 downshifts. The characteristics of the modulator valve that produce each of these features is discussed below.

FIG. 2 shows valve 36 disposed to regulate L/R pressure to clutch 32. Fluid at line pressure is supplied to port 76 when the manual valve is located at the PRN ranges and when the first forward ratio is produced with the manual valve in the OD range. In the P and N ranges and in first gear in the OD range, spring 52 opposes the feedback pressure force on the left-hand surface of land 54 of spool 40, thereby regulating priming pressure to approximately 6.3 psi in passage 34, which supplies the clutch cylinder of the low/reverse clutch 32. In this way, the clutch cylinder is supplied with a regulated low magnitude priming pressure throughout the full range of line pressure supplied to port 76 when the manual valve is in the park or neutral range and when the first forward speed ratio is produced with the manual valve in the OD range.

When the gear selector and manual valve 14 are in the M1 range and the first forward speed ratio is produced, and in the R range, line pressure is supplied to ports 76 and 60 of the modulator valve 36. Fluid in port 60 passes through radial passage 58 to the right-hand end of spool 44, thereby forcing spool 44 leftward into contact with land 56 and assisting spring 52 in regulating pressure supplied through port 34 to the low/reverse clutch 32. FIG. 2 shows spools 40 and 44 moved leftward due to the effect of pressure in port 60 and passage 58. Fluid pressure supplied to ports 76 and 60 varies in the range 80–175 psi, and the modulated pressure supplied through port 66 and passage 34 to clutch 32 is modulated in the range of 14–40 psi. The lower modulated pressure, 14 psi, matches the pressure required to stroke clutch 32 and improves noise, vibration and harshness associated with low speed 2-1 downshifts in comparison to high-speed 2-1 downshifts.

When the gear selector and manual valve 14 are located in the reverse range and during 2-1 manual downshifts, line pressure is supplied to ports 76, 80 and 60 of modulator valve 36. FIG. 3 shows valve 36 disposed as it is in this condition. Valve 36 regulates pressure in low/reverse clutch 32 and port 66 at 6.3 psi during the priming mode, and up to 14 psi in the stroking mode while the clutch piston is moving the friction plates of the clutch into mutual contact. The clutch is maintained primed and stroked while passage 76 is virtually unrestricted, thereby permitting the clutch to stroke at a relatively high rate. Thereafter, valve 36 shuttles gradually in the right-hand direction, thereby connecting reverse pressure in passage 30 through orifice 120, port 80, bore 42, port 66 and passage 34 to clutch 32. This action results in faster and smoother clutch engagements.

When the gear selector and manual valve 14 are moved to the M2 range or when commanding gear ratio changes to the second or third speed ratio, fluid is supplied to port 72 either as M2 pressure or S2 pressure, and fluid is vented from port 80. A pressure force developed on the end of spool 38 due to M2 pressure or S2 pressure in port 72 overcomes the effect of spring 52 and moves valve spools 38, 40 and 44 to the right-hand end of the valve bore, thereby venting clutch 32.

When the gear selector and manual valve 14 are in the OD range and the transmission is operating in the second, third or fourth gear ratios, or the manual valve 14 is in the M2 range and the transmission is operating in the second or third gears, ports 76 and 80 are vented. Therefore, regardless of the location of spool 40, clutch 32 is vented.

FIGS. 3 and 4 show that modulating valve 36 is prevented from fully opening port 76, the PRN1 circuit, and port 80, the R circuit. This feature improves the valve response when performing manual 2-1 downshifts. When stroking the clutch immediately prior to fully engaging it, the spools of the valve are essentially at the extreme left-hand end of bore 42. When the clutch is completely stroked, and begins to regulate, center spool 40 moves rightward, as shown in FIG. 4, in order to regulate pressure applied to clutch 32. This movement of the center spool is opposed by damping orifice 122 located in feedback passage 70. The orifice produces a delay that permits clutch pressure to overshoot the regulated clutch pressure. This overpressure condition can become pronounced when ambient temperature is low. To avoid this condition the ports of the valve are located in relation to the control lands of spool 40 such that the valve is never fully opened to port 76 or port 80. This partial closure does not increase the circuit restriction significantly but it improves valve response time noticeably.

We claim:

1. In an hydraulic system for controlling and actuating friction elements of an automatic transmission, a valve for controlling pressure applied to a friction element, comprising:
   supply ports connectable to sources of pressurized hydraulic fluid;
   feed ports communicating with a friction element;
   multiple spools having mutually spaced control lands, located in a bore communicating with the supply and feed ports, moveable along the bore applied to the spool, the control lands selectively opening and closing the feed and supply ports;
   priming means for supplying to the friction element a predetermined substantially constant pressure regulated to a relatively low magnitude from a higher magnitude pressure supplied to the valve through a supply port comprising a first supply port communicating with the bore; a first spool having a first control land that opens and closes communication between the friction element and the first supply port; a first feed port located on the first side of the first control land, connected to the friction element; first spring means for biasing the first spool to open the first supply port to the first feed port; a second feed port located on a second side of the first control land, connected to the friction element, pressure in the second feed port biasing the first spool to close the first supply port;
   modulating means for supplying to the friction element a pressure that varies with the magnitude of a control pressure supplied to the valve through a supply port; and
   stroking means for rapidly supplying fluid to the friction element comprising a second spool adjacent the first spool, second spring means for biasing the second spool away from the first spool, and a second supply pore communicating with the bore, pressure in the second supply port urging the second spool into contact with the first spool no open the first supply port to the first feed port.

2. The valve of claim 1 further comprising means for fully engaging the friction element.

3. The valve of claim 2 comprising:
   a first supply port communicating with the bore;
   a first spool having a first control land that opens and closes communication between the friction element and the first supply port;
   a first feed port located on a first side of the first control land, connected to the friction element;
   a second feed port located on a second side of the first control land, connected to the friction element, pressure in the second feed port biasing the first spool to close the first supply port;

first spring means for biasing the first spool to open the first supply port to the first feed port;

a second spool adjacent the first spool;

second spring means for biasing the second spool away from the first spool;

a second supply port communicating with the bore, pressure in the second supply port urging the second spool into contact with the first spool to open the first supply port to the first feed port;

a third supply port, opened and closed by a control land of the first spool, communicating selectively with the friction element through a feed port.

4. The valve of claim 1 further comprising means for releasing the friction element.

5. The valve of claim 4 comprising:

a first supply port communicating with the bore;

a first spool having a first control land that opens and closes communication between the friction element and the first supply port;

a first feed port located on a first side of the first control land, connected to the friction element;

a second feed port located on a second side of the first control land, connected to the friction element, pressure in the second feed port biasing the first spool to close the first supply port;

first spring means for biasing the first spool to open the first supply port to the first feed port;

a second spool adjacent the first spool;

second spring means for biasing the second spool away from the first spool;

a second supply port communicating with the bore, pressure in the second supply port urging the second spool into contact with the first spool to open the first supply port to the first feed port.

6. In an hydraulic system for controlling and actuating friction elements of an automatic transmission, a valve for controlling pressure applied to a friction element, comprising:

a first supply port communicating with the bore;

a first spool having a first control land that opens and closes communication between the friction element and the first supply port;

a first feed port located on a first side of the first control land, connected to the friction element;

a second feed port located on a second side of the first control land, connected to the friction element, pressure in the second feed port biasing the first spool to close the first supply port;

first spring means for biasing the first spool to open the first supply port to the first feed port;

a second spool adjacent the first spool;

second spring means for biasing the second spool away from the first spool;

a second supply port communicating with the bore, pressure in the second supply port urging the second spool into contact with the first spool to open the first supply port to the first feed port;

a third supply port, opened and closed by a control land of the first spool, communicating selectively with the friction element through a feed port;

a third spool adapted to contact and move the first spool in the bore; and a fourth supply port, opened and closed by the third spool, pressure in the fourth supply port urging the third spool to force the second spool to a position where the first supply port is closed.

* * * * *